US010540904B2

(12) United States Patent
Ouellette

(10) Patent No.: US 10,540,904 B2
(45) Date of Patent: Jan. 21, 2020

(54) SYSTEMS AND METHODS FOR ASSISTING WITH AIRCRAFT LANDING

(71) Applicant: BOMBARDIER INC., Dorval (CA)

(72) Inventor: Benoit Ouellette, Verdun (CA)

(73) Assignee: BOMBARDIER INC., Dorval (CA)

( * ) Notice: Subject to any disclaimer, the term of this patent is extended or adjusted under 35 U.S.C. 154(b) by 65 days.

(21) Appl. No.: 15/571,628

(22) PCT Filed: May 4, 2016

(86) PCT No.: PCT/IB2016/052551
§ 371 (c)(1),
(2) Date: Nov. 3, 2017

(87) PCT Pub. No.: WO2016/181260
PCT Pub. Date: Nov. 17, 2016

(65) Prior Publication Data
US 2018/0144647 A1 May 24, 2018

Related U.S. Application Data

(60) Provisional application No. 62/158,944, filed on May 8, 2015.

(51) Int. Cl.
*G08G 5/02* (2006.01)
*G01C 23/00* (2006.01)
*G08G 5/00* (2006.01)

(52) U.S. Cl.
CPC .......... *G08G 5/025* (2013.01); *G01C 23/005* (2013.01); *G08G 5/0021* (2013.01)

(58) Field of Classification Search
CPC .............. G01C 23/005; G08G 5/0021
(Continued)

(56) References Cited

U.S. PATENT DOCUMENTS 8,195,347 B2  6/2012  Boorman
8,489,261 B2  7/2013  Albert et al.
(Continued)

FOREIGN PATENT DOCUMENTS

EP  1464576 A2  10/2004
EP  2261878 A1  12/2010
EP  2282174 A2   2/2011

OTHER PUBLICATIONS

PCT international Search Report and Written Opinion dated Jun. 24, 2016 re: International Application No. PCT/IB2016/052551.
(Continued)

*Primary Examiner* — Maceeh Anwari
(74) *Attorney, Agent, or Firm* — Norton Rose Fulbright Canada LLP

(57) ABSTRACT

Systems, devices and methods a for assisting a pilot with aircraft landing are disclosed. One exemplary method comprises receiving data representative of a current approach/landing capability of the aircraft and data representative of an approach/landing intent of the pilot; and showing a combined indicator graphically and simultaneously indicating the current approach/landing capability of the aircraft and the approach/landing intent of the pilot on a display device of the aircraft. The approach/landing intent of the pilot may be graphically indicated via cooperation between a first graphical object of the indicator and a second graphical object of the indicator. The method may graphically indicate a system degradation affecting the current approach/landing capability of the aircraft with the same indicator.

33 Claims, 7 Drawing Sheets

(58) Field of Classification Search
USPC .......................................................... 701/16
See application file for complete search history.

(56) References Cited

U.S. PATENT DOCUMENTS

| | | |
|---|---|---|
| 8,560,150 B1 | 10/2013 | Phillips et al. |
| 8,798,818 B2 | 8/2014 | Wiesemann et al. |
| 2011/0184595 A1 | 7/2011 | Albert et al. |
| 2014/0350755 A1 | 11/2014 | Caillaud et al. |

OTHER PUBLICATIONS

English translation of European patent document No. EP 1464576 dated Oct. 6, 2004, https://www.google.com/patents/EP1464576A2?cl=en, accessed on Oct. 31, 2017.

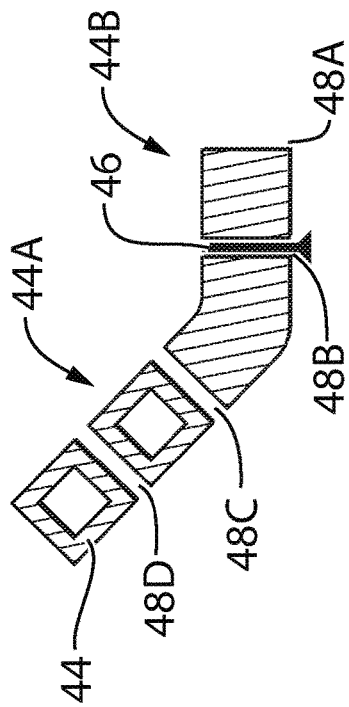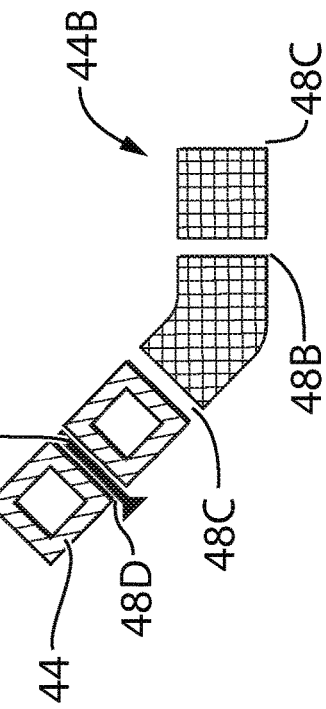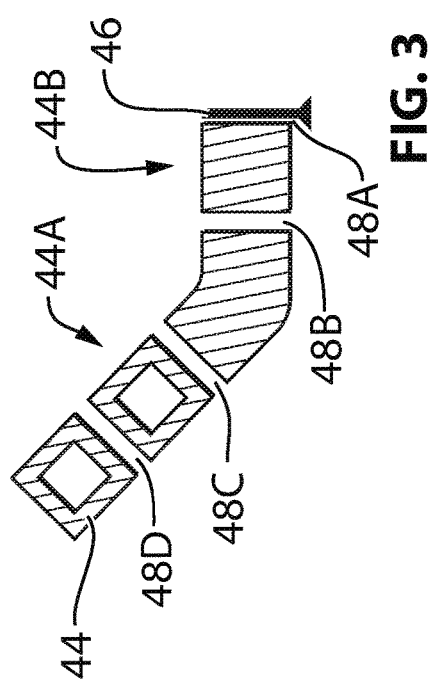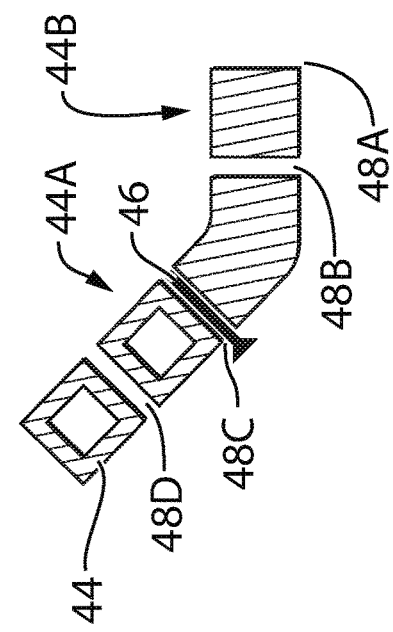

INTENT: STEEP APPROACH
CAPABILITY: AVAILABLE

INTENT: SVS APPROACH
CAPABILITY: AVAILABLE

SYSTEMS AND METHODS FOR ASSISTING WITH AIRCRAFT LANDING

CROSS-REFERENCE TO RELATED APPLICATION(S)

This application is a national phase application under 35 U.S.C. 371 of International Patent Application No. PCT/IB2016/052551 filed on May 4, 2016, which claims priority from U.S. Provisional Patent Application Ser. No. 62/158,944 filed on May 8, 2015, the entire content of which is incorporated herein by reference.

TECHNICAL FIELD

The disclosure relates generally to aircraft operation, and more particularly to systems, devices and methods for assisting a flight crew during aircraft approach and landing.

BACKGROUND OF THE ART

The final approach phase of an aircraft is one of the most critical and highest workload of flight phases. When executing a final approach and landing, aircraft pilots have to manage various types of information to make the landing decision and ultimately land the aircraft. During the approach, a split second decision needs to be taken as to whether to continue or discontinue the landing. Wrongly assuming that an automated landing system will land the aircraft automatically can have catastrophic results. Conversely, aborting the approach/landing assuming a degradation of the automated landing system while the aircraft is still capable of performing the desired landing will incur an unnecessary cost to an airline. Existing methods for presenting approach/landing-related information to the flight crew requires a significant amount of the flight crew's attention during a flight phase of high workload and can potentially lead to misinterpretation of the information.

Improvement is desirable.

SUMMARY

In one aspect, the disclosure describes a system for assisting a pilot with landing an aircraft. The system comprises:

a data processor; and machine-readable memory storing instructions executable by the processor and configured to cause the processor to: using data representative of a current approach/landing capability of the aircraft and data representative of an approach/landing intent of the pilot, generate an output for causing a display device of the aircraft to show an indicator graphically and simultaneously indicating the current approach/landing capability of the aircraft and the approach/landing intent of the pilot, the approach/landing intent of the pilot being graphically indicated via cooperation between a first graphical object of the indicator and a second graphical object of the indicator.

The first graphical object and the second graphical object may be of different colors.

The first graphical object may graphically indicate a plurality of potential approach/landing types. A position of the second graphical object relative to the first graphical object may indicate the approach/landing intent of the pilot from the plurality of potential approach/landing types.

The second graphical object may comprise a caret movably positionable relative to the first graphical object to indicate the approach/landing intent of the pilot.

The first graphical object may comprise a first segment representing an approach phase of operation of the aircraft and a second segment representing a landing phase of operation of the aircraft. The first and second segments of the first graphical object may be substantially linear. The first segment and the second segment may be non-parallel.

The first graphical object may comprise a first color graphically indicating one or more approach/landing types that are available and a second color graphically indicating one or more approach/landing types that are unavailable.

The first graphical object may comprise a third (i.e., degradation) color graphically indicating a system degradation affecting the current approach/landing capability.

The indicator may graphically indicate a system degradation affecting the current approach/landing capability.

The output of the processor may be configured to cause a temporary showing of a degradation color on at least part of the first graphical object to graphically indicate the system degradation.

In another aspect, the disclosure describes a display device for assisting a pilot with landing an aircraft. The display device comprises:

a display area; and an indicator shown in the display area, the indicator graphically and simultaneously illustrating a current approach/landing capability of the aircraft and an approach/landing intent of the pilot, the approach/landing intent of the pilot being graphically indicated via cooperation between a first graphical object of the indicator and a second graphical object of the indicator.

The first graphical object and the second graphical object may be of different colors.

The first graphical object may graphically indicate a plurality of potential approach/landing types.

A position of the second graphical object relative to the first graphical object may indicate the approach/landing intent of the pilot from the plurality of potential approach/landing types.

The second graphical object may comprise a caret movably positionable relative to the first graphical object to indicate the approach/landing intent of the pilot.

The first graphical object may comprise a first segment representing an approach phase of operation of the aircraft and a second segment representing a landing phase of operation of the aircraft.

The first and second segments of the first graphical object may be substantially linear. The first segment and the second segment may be non-parallel. The first graphical object may comprise a first color graphically indicating one or more approach/landing types that are available and a second color graphically indicating one or more approach/landing types that are unavailable.

The first graphical object may comprise a third color graphically indicating a system degradation affecting the current approach/landing capability.

The indicator may graphically indicate a system degradation affecting the current approach/landing capability.

The system degradation may be graphically indicated by a temporary showing of a degradation color on at least part of the first graphical object.

The display device may be a primary flight display of the aircraft.

In another aspect, the disclosure describes a method for assisting a pilot with landing an aircraft. The method comprises:

receiving data representative of a current approach/landing capability of the aircraft and data representative of an approach/landing intent of the pilot; and on a display device of the aircraft, showing an indicator graphically and simultaneously indicating the current approach/landing capability of the aircraft and the approach/landing intent of the pilot, the approach/landing intent of the pilot being graphically indicated via cooperation between a first graphical object of the indicator and a second graphical object of the indicator.

The first graphical object and the second graphical object may be of different colors.

The first graphical object may graphically indicate a plurality of potential approach/landing types.

A position of the second graphical object relative to the first graphical object may indicate the approach/landing intent of the pilot from the plurality of potential approach/landing types.

The second graphical object may comprise a caret movably positionable relative to the first graphical object to indicate the approach/landing intent of the pilot.

The first graphical object may comprise a first segment representing an approach phase of operation of the aircraft and a second segment representing a landing phase of operation of the aircraft. The first and second segments of the first graphical object may be substantially linear. The first segment and the second segment may be non-parallel.

The first graphical object may comprise a first color graphically indicating one or more approach/landing types that are available and a second color graphically indicating one or more approach/landing types that are unavailable.

The method may comprise temporarily causing the first graphical object to comprise a third color to graphically indicate a system degradation affecting the current approach/landing capability.

The indicator may graphically indicate a system degradation affecting the current approach/landing capability.

The method may comprise temporarily showing a degradation color on at least part of the first graphical object to graphically indicate the system degradation.

In another aspect, the disclosure describes a system for assisting a pilot with landing an aircraft. The system comprises:

a data processor; and machine-readable memory storing instructions executable by the processor and configured to cause the processor to: using data representative of a current approach/landing capability of the aircraft and data representative of an approach/landing intent of the pilot, generate an output for causing a display device of the aircraft to show an indicator graphically and simultaneously indicating the current approach/landing capability of the aircraft and the approach/landing intent of the pilot, the indicator graphically indicating a system degradation affecting the current approach/landing capability.

The output of the processor may be configured to cause temporary showing of a degradation color on at least part of the indicator to graphically indicate the system degradation.

The output of the processor may be configured to cause the approach/landing intent of the pilot to be graphically indicated via cooperation between a first graphical object of the indicator and a second graphical object of the indicator.

The first graphical object may comprise a first color graphically indicating one or more approach/landing types that are available and a second color graphically indicating one or more approach/landing types that are unavailable.

The first graphical object may comprise a third color graphically indicating the system degradation.

In another aspect, the disclosure describes a display device for assisting a pilot with landing an aircraft. The display device comprises:

a display area; and an indicator shown in the display area, the indicator graphically and simultaneously illustrating a current approach/landing capability of the aircraft and an approach/landing intent of the pilot, the indicator graphically indicating a system degradation affecting the current approach/landing capability.

The system degradation may be graphically indicated by a temporary showing of a degradation color on at least part of the indicator.

The approach/landing intent of the pilot may be graphically indicated via cooperation between a first graphical object of the indicator and a second graphical object of the indicator.

The first graphical object may comprise a first color graphically indicating one or more approach/landing types that are available and a second color graphically indicating one or more approach/landing types that are unavailable.

The first graphical object may comprise a third color graphically indicating the system degradation.

In another aspect, the disclosure describes a method for assisting a pilot with landing an aircraft. The method comprises:

receiving data representative of a current approach/landing capability of the aircraft and data representative of an approach/landing intent of the pilot;

on a display device of the aircraft, showing an indicator graphically and simultaneously indicating the current approach/landing capability of the aircraft and the approach/landing intent of the pilot; and graphically indicating a system degradation affecting the current approach/landing capability with the indicator.

The method may comprise graphically indicating the system degradation by temporarily showing a degradation color on at least part of the indicator.

The method may comprise graphically indicating the approach/landing intent of the pilot via cooperation between a first graphical object of the indicator and a second graphical object of the indicator.

The first graphical object may comprise a first color graphically indicating one or more approach/landing types that are available and a second color graphically indicating one or more approach/landing types that are unavailable.

The method may comprise causing the first graphical object to comprise a third color to graphically indicate the system degradation.

In another aspect, the disclosure describes an aircraft comprising one or more systems as disclosed herein.

In another aspect, the disclosure describes an aircraft comprising one or more display device as disclosed herein.

Further details of these and other aspects of the subject matter of this application will be apparent from the detailed description and drawings included below.

DESCRIPTION OF THE DRAWINGS

Reference is now made to the accompanying drawings, in which:

FIG. 3 shows an exemplary configuration of an indicator generated by the system of FIG. 2 and graphically showing the current approach/landing capability of the aircraft of FIG. 1 and also the approach/landing intent of the flight crew;

FIG. 4 shows another exemplary configuration of the indicator generated by the system of FIG. 2 and graphically showing the current approach/landing capability of the aircraft of FIG. 1 and also the approach/landing intent of the flight crew;

FIG. 5 shows another exemplary configuration of the indicator generated by the system of FIG. 2 and graphically showing the current approach/landing capability of the aircraft of FIG. 1 and also the approach/landing intent of the flight crew;

FIG. 6 shows another exemplary configuration of the indicator generated by the system of FIG. 2 and graphically showing the current approach/landing capability of the aircraft of FIG. 1 and also the approach/landing intent of the flight crew;

DETAILED DESCRIPTION

The present disclosure describes systems, display devices, methods and computer program products useful for aircraft approach and landing. In various aspects, a combined indicator is presented to the flight crew to graphically and simultaneously indicate the current approach/landing capability of the aircraft being flown and also the approach/landing intent of the flight crew. In some embodiments, the indicator may graphically indicate the presence of a system degradation affecting the current approach/landing capability of the aircraft. The indicator may provide relevant information to the flight crew in a clear and integrated manner that is also intuitive and relatively easy to interpret by the flight crew. This may contribute toward reducing pilot workload during a critical phase of flight. The use of such combined indicator may also address the problem of the flight crew having to interpret and integrate information coming from multiple indications at a critical moment during a flight and also correlating this information with the intention of the flight crew.

Aspects of various embodiments are described through reference to the drawings.

Figure 1:
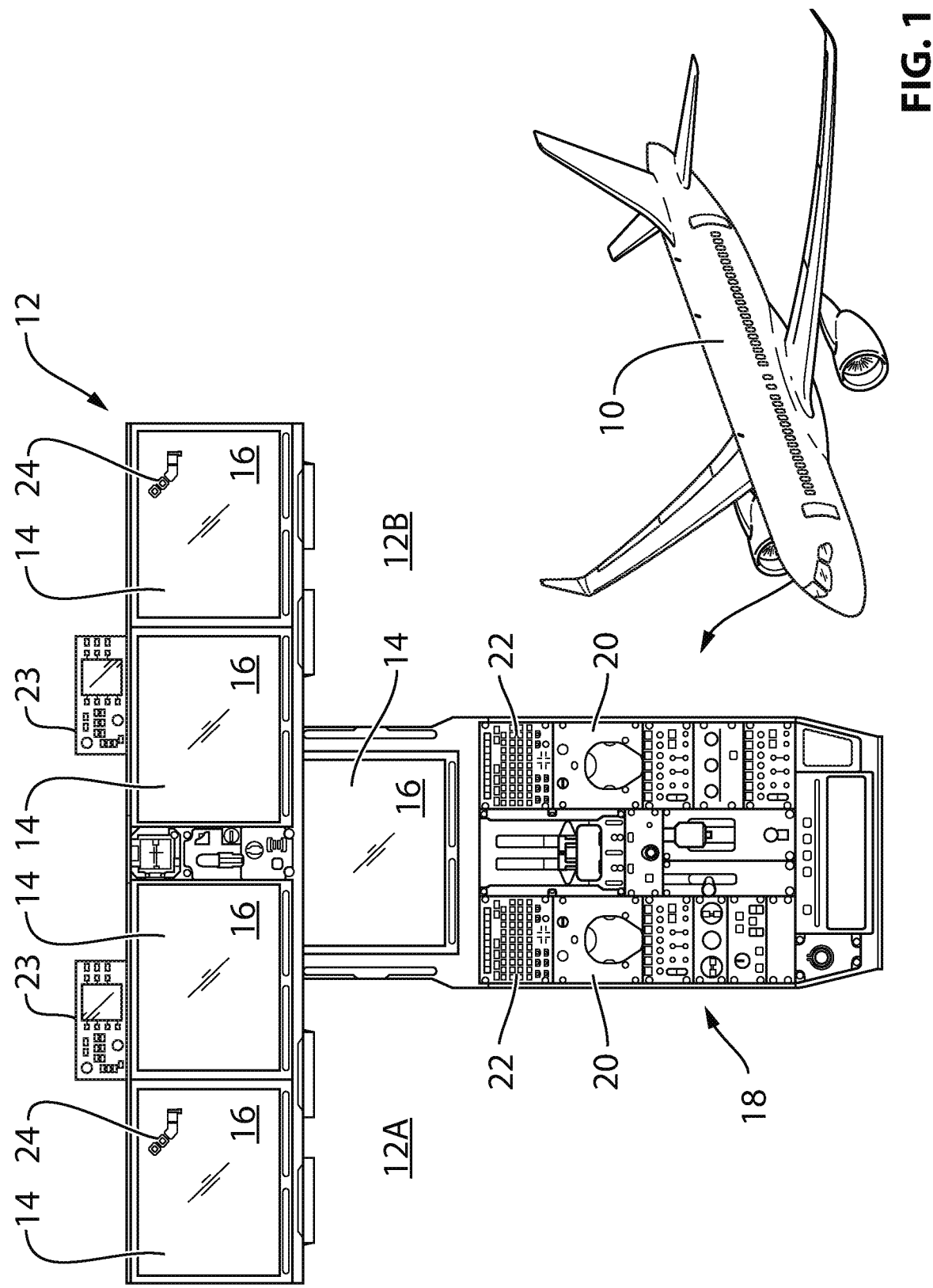
FIG. 1 shows an exemplary aircraft flight deck and a corresponding exemplary aircraft comprising the flight deck.

FIG. 1 shows an exemplary aircraft 10 and a partial schematic representation of flight deck 12 which may be part of aircraft 10. Aircraft 10 may be a corporate, private, commercial or any other type of aircraft. For example, aircraft 10 may be a fixed-wing aircraft or rotary-wing aircraft. In some embodiments, aircraft 10 may be a narrow-body, twin engine jet airliner. Flight deck 12 may comprise additional or fewer elements than those shown and described herein. Flight deck 12 may comprise left portion 12A intended to be used by a pilot (sometimes referred as "captain") of aircraft 10 and right portion 12B intended to be used by a co-pilot (sometimes referred as "first officer") of aircraft 10. Left portion 12A and right portion 12B may comprise functionally identical components so that at least some operational redundancy may be provided between left portion 12A and right portion 12B of flight deck 12.

Flight deck 12 may comprise one or more display devices 14 providing respective display areas 16. In the particular configuration of flight deck 12 shown, left portion 12A and right portion 12B may each comprise two display devices 14 and an additional display device 14 may be provided in pedestal region 18 of flight deck 12. Display device 14 provided in pedestal region 18 may be shared between the captain and the first officer during normal operation of aircraft 10. Display devices 14 may include one or more cathode-ray tubes (CRTs), liquid crystal displays (LCDs), plasma displays, light-emitting diode (LED) based displays or any known or other type of display device that may be suitable for use in flight deck 12. Display devices 14 may be used to display operational and status information about various systems of aircraft 10, information related to flight/mission planning, maps and any other information that may be useful for the flight crew (e.g., pilots) during the operation of aircraft 10. Display devices 14 may facilitate dialog between the flight crew and various systems of aircraft 10 via suitable graphical user interfaces. Flight deck 12 may comprise one or more data input devices such as, for example, one or more cursor control devices 20, one or more multi-function keypads 22 and one or more (e.g., standalone or multifunction) controllers 23 that may permit data entry by the flight crew. For example, such controller(s) 23 may be disposed in the glare shield above one or more display devices 14. In various embodiments, data representative of one or more approach minima (i.e., decision heights) may be entered by the flight crew via a suitable data input device of flight deck 12 and such data may be used to infer the approach/landing intent of the flight crew as explained below.

One or more of display devices 14 may comprise indicator 24 displayed in respective display areas 16 during one or more phases of flight of aircraft 10. For example, indicator 24 may be displayed during a final approach phase and/or a landing phase of aircraft 10. As explained below, indicator 24 may assist the flight crew of aircraft 10 during approach and/or landing phases. Display device(s) 14 displaying indicator 24 may be considered a primary flight display (PFD) of flight deck 12. Accordingly, one instance of indicator 24 may be displayed on the captain's PFD and another instance of indicator 24 may be displayed on the first officer's PFD for example. Alternatively, a single instance of indicator 24 may be displayed on a display device 14 that is conveniently located to be visible by both the captain and the first officer. In various embodiments, indicator 24 may be temporarily displayed or alternatively may be permanently displayed. In some embodiments, indicator 24 may be selectively displayed based on input from the flight crew.

Figure 2:
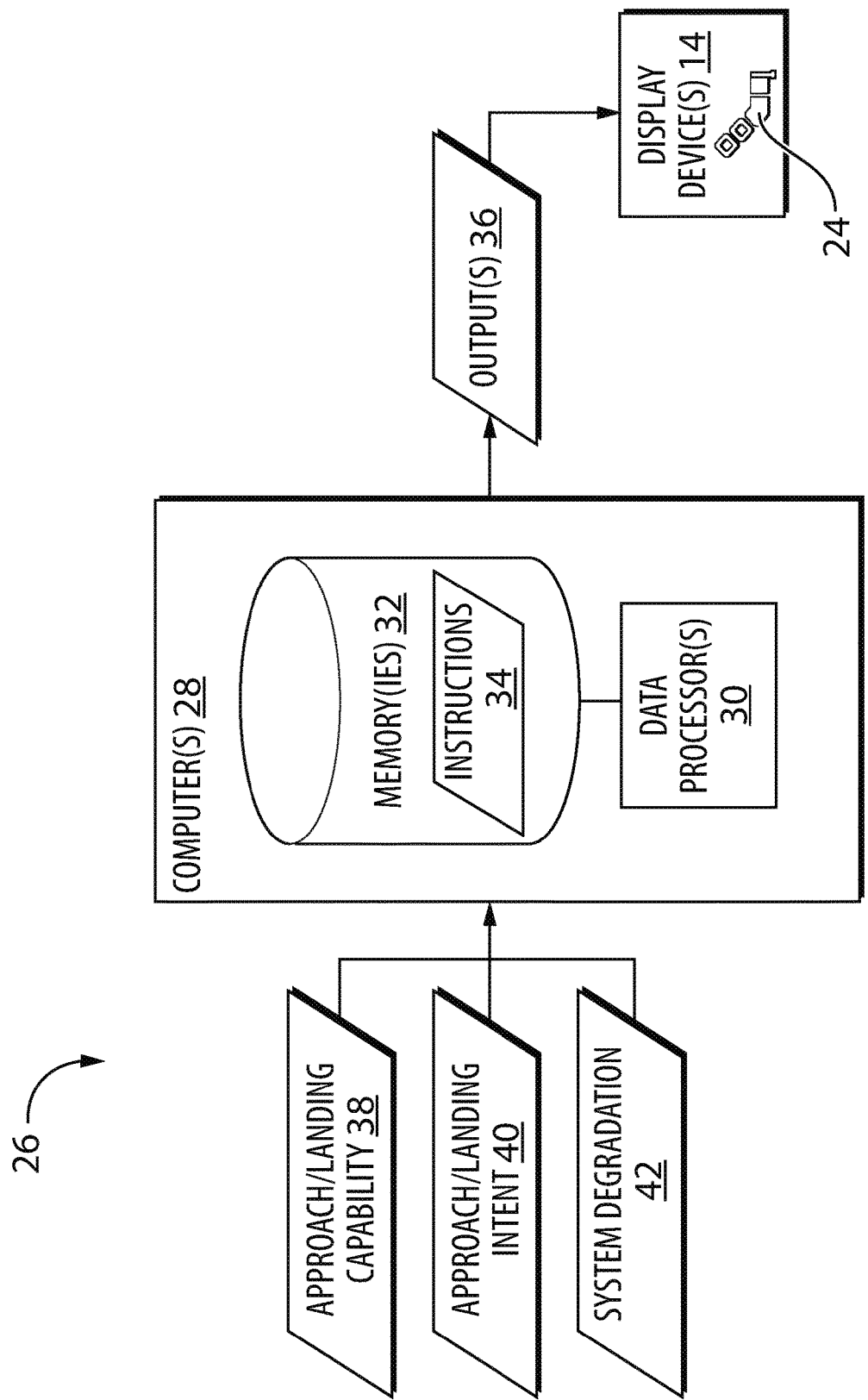
FIG. 2 shows a schematic representation of an exemplary system for assisting a flight crew with landing the aircraft of FIG. 1.

FIG. 2 shows an exemplary system 26 for assisting with landing of aircraft 10. System 26 may be integrated with flight deck 12. System 26 may comprise one or more computers 28 (referred hereinafter as "computer 28") operatively coupled to display device 14 of flight deck 12. Computer 28 may comprise one or more data processors 30 (referred hereinafter as "data processor 30") and computer-readable memories 32 (referred hereinafter as "memory 32") storing machine-readable instructions 34 executable by data processor 30 and configured to cause data processor 30 to generate one or more outputs 36 (referred hereinafter as "output 36"). Output 36 may comprise one or more signals for causing display device 14 of aircraft 10 to show indicator 24. The configuration of indicator 24 may be based on data representative of a current approach/landing capability 38 (referred hereinafter as "capability data 38") related to aircraft 10 and data representative of an approach/landing intent 40 (referred hereinafter as "pilot intent data 40") of the flight crew. In some embodiments, the configuration of indicator 24 may be based on data representative of a degradation 42 (referred hereinafter as "system degradation data 42") of one or more systems of aircraft 10. The information displayed by indicator 24 may be substantially real-time information about approach/landing capability, approach/landing intent and system degradation. Accordingly, indicator 24 may be dynamic so that current (i.e., up-to-date) information may be presented to the flight crew.

Computer 28 may be part of an avionics suite of aircraft 10. For example, in some embodiments, computer 28 may carry out additional functions than those described herein including the management of one or more graphic user interfaces of flight deck 12 and/or other part(s) of aircraft 10. In various embodiments, computer 28 may comprise more than one computer or data processors where the methods disclosed herein (or parts thereof) could be performed in parts using a plurality of computers or data processors, or, alternatively, be performed entirely using a single computer or data processor. In some embodiments, computer 28 could be physically integrated with (e.g., embedded in) display device 14.

Processor 30 may comprise any suitable device(s) to cause a series of steps to be performed by computer 28 so as to implement a computer-implemented process such that instructions 34, when executed by computer 28 or other programmable apparatus, may cause the functions/acts specified in the methods described herein to be executed. Processor 30 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 32 may comprise any suitable known or other machine-readable storage medium. Memory 32 may comprise non-transitory computer readable storage medium such as, for example, but not limited to, an electronic, magnetic, optical, electromagnetic, infrared, or semiconductor system, apparatus, or device, or any suitable combination of the foregoing. Memory 32 may include a suitable combination of any type of computer memory that is located either internally or externally to computer 28 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 32 may comprise any storage means (e.g. devices) suitable for retrievably storing machine-readable instructions 34 executable by processor 30.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 32) having computer readable program code (e.g., instructions 34) embodied thereon. The computer program product may, for example, be executed by computer 28 to cause the execution of one or more methods disclosed herein in entirety or in part.

Computer program code for carrying out operations for aspects of the present disclosure in accordance with instructions 34 may be written in any combination of one or more programming languages, including an object oriented programming language such as Java, Smalltalk, C++ or the like and conventional procedural programming languages, such as the "C" programming language or other programming languages. Such program code may be executed entirely or in part by computer 28 or other data processing device(s).

Capability data 38 may comprise information that is indicative of the aircraft's current ability to perform one or more approach/landing types at an airport that is being approached for landing by aircraft 10. For example, capability data 38 may comprise information related to the availability and health of equipment on-board and/or off-board of aircraft 10 required for instrument-based approach and landing. For example, aircraft 10 may comprise an auto-pilot system with automated landing (autoland) function that may be used to automate at least part of an approach and/or landing procedure of an aircraft's flight while the flight crew is supervising the process. Such autoland function may enable aircraft 10 to land in weather conditions that would otherwise be dangerous or impossible to operate in. The current capability of aircraft 10 to perform a particular approach/landing type may depend on a number of factors including, for example, the performance and health of the redundant auto-pilot system and associated systems and devices on-board of aircraft 10, and also, the performance and health of the off-board (e.g., on-ground) equipment necessary to use the autoland function of the auto-pilot system of aircraft 10. Accordingly, capability data 38 may comprise sensed parameters relating to one or more systems of aircraft 10 and/or information related to the availability and health of off-board equipment received via one or more communication or navigation systems of aircraft 10. For example, capability data 38 may comprise data acquired by a health monitoring unit of aircraft 10 via one or more sensors or otherwise.

Capability data 38 may contain information permitting computer 28 to determine the current approach/landing types available to the pilot of aircraft 10 based on the current health or availability of relevant systems (e.g., on-board or off-board) for landing at a particular airport. For example, capability data 38 may be used by computer 28 to determine whether or not an autoland function of the auto-pilot system may be used for landing aircraft 10 at a particular airport and at the present time. For example, capability data 38 may be used by computer 28 to determine whether one or more of the following approach/landing types may be available to the flight crew at the present time: approach/landing category I (commonly referred to as "CAT I"), approach/landing category II (commonly referred to as "CAT II"), approach/landing category IIIa (commonly referred to as "CAT IIIa"), approach/landing category IIIb (commonly referred to as "CAT IIIb") and/or approach/landing category IIIc (commonly referred to as "CAT IIIc"). The approach/landing types referenced above are also commonly known as instrument landing system (ILS) categories. Other approach/landing types that may be performed by aircraft 10 may include a steep approach and/or an approach using a synthetic vision system (SVS) of aircraft 10.

Capability data 38 may contain information about the availability of relevant systems based on information provided by the flight crew, an operator of aircraft 10 (e.g., airline), maintenance personnel or another authorized party. For example, capability data 38 may comprise information representative of a choice made by an airline to enable or disable some more advanced approach/landing capabilities on its aircraft 10 for economical or other reasons. In such case, some approach/landing capabilities would be disabled and indicated as such via indicator(s) 24 by for example, the use of a "capability unavailable" color (e.g., gray) so as to graphically indicate to the flight crew that certain approach/landing types are unavailable or disabled. In some embodiments, capability data 38 may be stored in memory 32 or an aircraft personality module for permanently disabling applicable approach/landing capabilities.

Similarly, indicator 24 may be configured, via capability data 38, to graphically indicate the approach/landing capability during a MMEL (master minimum equipment list) or MEL (minimum equipment list) type of dispatch where aircraft 10 has been authorized to operate for a relatively short period of time (e.g., 3 to 10 days) with faulty equipment that has been secured and can no longer perform its function. In such case, some approach/landing capabilities would be disabled and indicated as such via indicator(s) 24 by for example, the use of the "capability unavailable" color (e.g., gray) so as to graphically indicate to the flight crew that certain approach/landing types are unavailable or disabled.

Pilot intent data 40 may comprise information that may be used by computer 28 to determine the flight crew's current intention with respect to the approach/landing type that is to be carried out (i.e., which approach/landing type is actually being carried out by the flight crew). Pilot intent data 40 may comprise information provided to system 26 by the flight crew via one or more data input interfaces such as cursor control device 20, multi-function keypad 22 and/or controller 23 to permit the flight crew to explicitly specify the approach/landing type that is to be carried out. For example, the flight crew may input data that explicitly specifies that the crew intends to carry out a steep approach and/or an approach using a synthetic vision system (SVS) of aircraft 10.

Alternatively or in addition pilot intent data 40 may comprise operating parameters of aircraft 10 that may be used to infer the flight crew's intention with respect to the approach/landing type that is to be carried out. For example, the flight crew's intention may be inferred based on a comparison of a sensed altitude with a decision height input by the flight crew during the crew's preparation for the approach. For example, if an input decision height associated with a CAT I approach/landing category has already passed during approach based on a sensed altitude, then computer 28 may determine that the flight crew's intent is to carry out an approach/landing type of CAT II or of a greater level of automation (e.g., CAT IIIa of CAT IIIb). In some embodiments, the flight crew's intention may be inferred based on a decision height and also the engagement of a specific approach mode on the auto-pilot.

Degradation data 42 may comprise information that may be used by computer 28 to provide an indication of a system fault or failure associated with aircraft 10 and that may affect the current approach/landing capability of aircraft 10. Accordingly, degradation data 42 may comprise information related to the health or status of one or more systems (e.g., auto-pilot) of aircraft 10 that may be required for instrument-based approach and landing. For example, capability data 38 may comprise data acquired by a health monitoring unit of aircraft 10 via one or more sensors or otherwise.

As explained below, system 26 may be used to provide indicator 24 in display area 16 where indicator 24 is configured to graphically and simultaneously indicate the current approach/landing capability of aircraft 10 and also the approach/landing intent of the flight crew. Indicator 24 may provide a combined indication of current approach/landing capability and the approach/landing intent of the flight crew so as to provide relevant information to the flight crew in a clear and integrated manner that is intuitive and relatively easy to interpret by the flight crew. In some embodiments, the use of indicator 24 may contribute toward reducing pilot workload during a critical phase of flight. The use of indicator 24 may also address the problem of the flight crew having to interpret and integrate information coming from multiple indications at a critical moment during a flight and also correlating this information with the intention of the flight crew. The use of indicator 24 may also provide a clear indication as to when during the approach/landing procedure, the flight crew must take over the operation of aircraft 10 from the automation.

Indicator 24 may provide indications in a graphical (e.g., pictorial) manner so as to facilitate the interpretation of the indications provided to the flight crew. The term "graphical" is intended to encompass any non-textual indications such as, for example, pictures, diagrams, curves, segments, carets and colors. The use of graphical indications may also reduce the risk of misinterpretation that may occur with text-based indications that comprise alphabetical characters. In various embodiments as described below, indicator 24 may utilize a graphical language to intuitively indicate: (1) the current approach/landing capability of aircraft 10; (2) the approach/landing intent of the flight crew; and optionally, (3) the presence of a system degradation affecting approach/landing capability of aircraft 10.

FIG. 3 shows an exemplary configuration of indicator 24 graphically and simultaneously showing the current approach/landing capability of aircraft 10 and also the approach/landing intent of the flight crew. Indicator 24 may comprise first graphical object 44 and second graphical object 46 which may be of different colors so as to facilitate visual perception of the information presented by indicator 24. First graphical object 44 may graphically indicate a plurality of potential approach/landing types via the position of notches 48A-48D within first graphical object 44. Each notch 48A-48D may indicate a different level of automation that may be available via the auto-pilot system (including autoland function) of aircraft 10. In some embodiments, first graphical object 44 may comprises first segment 44A representing an approach phase of operation of aircraft 10 and second segment 44B representing a landing phase of operation of aircraft 10. First segment 44A and second segment 44B may be substantially linear. In some embodiments, first segment 44A and second segment 44B may be non-parallel. In some embodiments, first segment 44A and second segment 44B may be connected to each other. Notches 48A-48D may be positioned along in a serial manner where notch 48A represents an approach/landing type having the greatest level of automation and notches 48B-48C respectively represent approach/landing types of progressively lower levels of automation.

Second graphical object 46 may comprise a caret movably (i.e., dynamically) positionable relative to first graphical object 44 to indicate the approach/landing intent of the flight crew. Second graphical object 46 may be movably positionable between notches 48A-48D so as to indicate which of the plurality of potential approach/landing types is intended (i.e, actually being carried out) by the flight crew. This way the approach/landing intent of the flight crew may be graphically indicated via cooperation (e.g., relative positioning) between first graphical object 44 of indicator 24 and second graphical object 46 of indicator 24. In this particular example, the approach/landing type associated with notch 48A corresponds to CAT IIIb, notch 48B corresponds to CAT IIIa, notch 48C corresponds to CAT II and notch 48D corresponds to CAT I. In the configuration of FIG. 3, the position of second graphical object 46 in notch 48A of first graphical object 44 graphically indicates that the approach/landing intent of the flight crew is CAT IIIb.

The approach/landing capability may be graphically indicated by the color of first graphical object 44. For example, a "capability available" color, such as green for example, may be used to indicate up to which notch 48A-48D is available to the flight crew. In the configuration of FIG. 3, the entirety of first graphical object 44 is shown in the "capability available" color in order to indicate that the full capability of the autoland function is currently available to the flight crew.

FIG. 4 shows another exemplary configuration of indicator 24 graphically and simultaneously showing the current approach/landing capability of aircraft 10 and also the approach/landing intent of the flight crew. In this particular configuration, second graphical object 46 is positioned at notch 48B so as to graphical indicate that the approach/landing intent of the flight crew corresponds to CAT IIIa. The entirety of first graphical object 44 is shown in the "capability available" color in order to indicate that the full capability of the autoland function is currently available to the flight crew.

FIG. 5 shows another exemplary configuration of indicator 24 graphically and simultaneously showing the current approach/landing capability of aircraft 10 and also the approach/landing intent of the flight crew. In this particular configuration, second graphical object 46 is positioned at notch 48C so as to graphical indicate that the approach/landing intent of the flight crew corresponds to CAT II. The entirety of first graphical object 44 is shown in the "capability available" color in order to indicated that the full capability of the autoland function is currently available to the flight crew.

FIG. 6 shows another exemplary configuration of indicator 24 graphically and simultaneously showing the current approach/landing capability of aircraft 10 and also the approach/landing intent of the flight crew. In this particular configuration, second graphical object 46 is positioned at notch 48D so as to graphically indicate that the approach/landing intent of the flight crew corresponds to CAT I. Part of first graphical object 44 to the left of notch 48C is shown in the "capability available" color in order to indicate that the capability of the auto-pilot system is currently available to perform an approach/landing type of up to CAT II. The part of first graphical object 44 to the right of notch 48C is shown in a "capability unavailable" color (e.g., gray) so as to graphically indicate to the flight crew that approach/landing types CAT IIIa and CAT IIIb are currently unavailable. In other words, first graphical object 44 may comprise a first color graphically indicating one or more approach/landing types that are available and a second color graphically indicating one or more approach/landing types that are unavailable.

In some embodiments, system 26 may include some alerting functionality that would alert the flight crew if, for example, an approach/landing intent selected or inferred corresponds to an approach/landing type that is currently unavailable.

Figure 7:
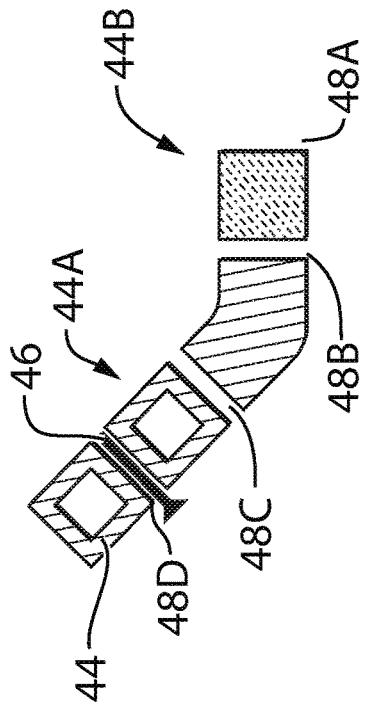
FIG. 7 shows another exemplary configuration of the indicator generated by the system of FIG. 2 and graphically showing the current approach/landing capability of the aircraft of FIG. 1.

FIG. 7 shows another exemplary configuration of indicator 24 graphically showing that no automated (i.e, instrument-based) approach/landing capabilities are available at this time. This could be due to a degradation of an aircraft system or to an unavailability or degradation of ground-based equipment. In this particular configuration, the entirety of first graphical object 44 is shown in the "capability unavailable" color in order to indicate that the capability of the auto-pilot is currently unavailable for any type of automated approach/landing. In this situation, the flight crew may have to carry out a visual approach/landing type if necessary. Second graphical object 46 is not shown in FIG. 7 and accordingly the approach/landing intent of the flight crew is not explicitly shown but may be implied as a "visual" approach/landing type.

Figure 8:
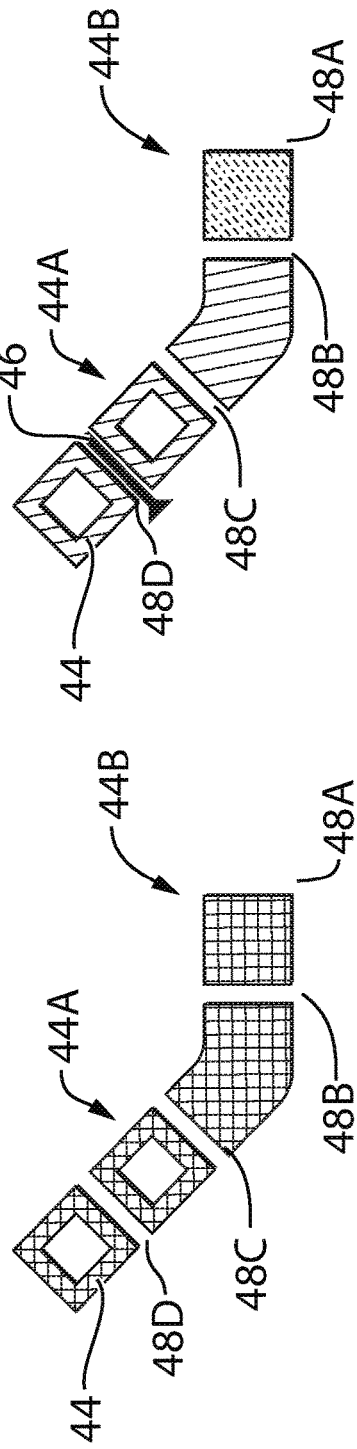
FIG. 8 shows another exemplary configuration of the indicator generated by the system of FIG. 2 and graphically showing the current approach/landing capability of the aircraft of FIG. 1, the approach/landing intent of the flight crew and the existence of a system degradation.

FIG. 8 shows another exemplary configuration of indicator 24 graphically and simultaneously showing the current approach/landing capability of aircraft 10 and also the approach/landing intent of the flight crew. Indicator 24 may graphically indicate a system degradation by way of showing a degradation (i.e., third) color (e.g., yellow or red) to illustrate which approach/landing type(s) is/are not available due to one or more system degradations. Indicator 24 may dynamically alert the flight crew of the system degradation. Such visual alert provided by indicator 24 may be accompanied by an aural alert. The degradation color may be selected to provide a high level of saliency when a system degradation is detected but not to the extent of presenting a distraction from continuing the approach. A system degradation triggering such alert may, for example, be associated with a fault or a failure of an aircraft system during the approach phase of flight. The system degradation may be determined by computer 38 based on system degradation data 42. In some embodiments, the degradation color may be shown only temporarily on indicator 24 so that the affected part of indicator 24 may subsequently revert back to showing the "capability unavailable" color (e.g., gray) after a temporary showing of the degradation color (e.g., red or yellow). In some embodiments, the degradation color may be shown on indicator 24 (e.g., continuously or intermittently) until the approach/landing procedure is completed or discontinued (e.g., a go-around). The showing of the degradation color may graphically indicate the presence of a degradation but may not necessarily identify the specific system degradation. Accordingly, the flight crew may choose to consult another source (e.g., message presented on a crew alerting system) in order to identify the specific system degradation.

In some embodiments, the degradation color may be shown repeatedly in an intermittent manner (e.g., blinking) so that the system degradation may be indicated to the flight crew over a longer period of time. Such period of time may, for example, be the entire period of time during which the system degradation is active, may be a predetermined amount of time or may be terminated upon acknowledgement of the system degradation by the flight crew. For example, the affected part of indicator 24 may repeatedly alternate between the degradation color (e.g., red or yellow) and the "capability unavailable" color (e.g., gray). Alternatively, the affected part of indicator 24 may repeatedly alternate between the degradation color (e.g., red or yellow) and a background color of indicator 24.

In the particular configuration of indicator 24 shown in FIG. 8, second graphical object 46 is positioned at notch 48D so as to graphically indicate that the approach/landing intent of the flight crew corresponds to CAT I. Part of first graphical object 44 to the left of notch 48B is shown in the "capability available" color in order to indicate that the capability of the auto-pilot system is currently available to perform an approach/landing type of up to CAT IIIa. The part of first graphical object 44 to the right of notch 48B is shown in the degradation color (e.g., yellow) so as to graphically indicate to the flight crew that the approach/landing type CAT IIIb is currently unavailable due to a system degradation.

Figure 9:
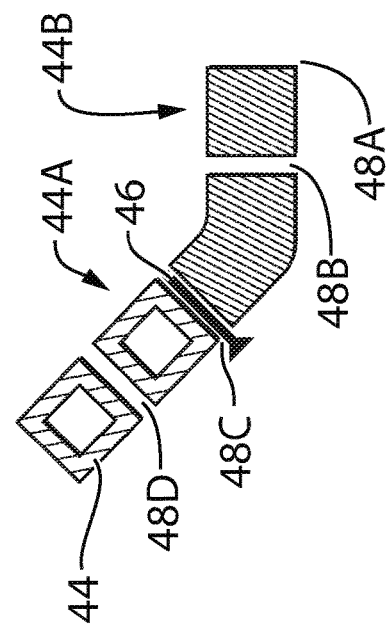
FIG. 9 shows another exemplary configuration of the indicator generated by the system of FIG. 2 and graphically showing the current approach/landing capability of the aircraft of FIG. 1, the approach/landing intent of the flight crew and the existence of a system degradation.

FIG. 9 shows another exemplary configuration of indicator 24 graphically and simultaneously showing the approach/landing capability of aircraft 10 and also the approach/landing intent of the flight crew. In this configuration of indicator 24 shown in FIG. 9, second graphical object 46 is positioned at notch 48C so as to graphically indicate that the approach/landing intent of the flight crew corresponds to CAT II. Part of first graphical object 44 to the left of notch 48C is shown in the "capability available" color (e.g., green) to indicate that the capability of the auto-pilot system is currently available to perform an approach/landing type of up to CAT II. The part of first graphical object 44 to the right of notch 48C is shown in the degradation color (e.g., red) so as to graphically indicate to the flight crew that the approach/landing types CAT IIIa and CAT IIIb are currently unavailable due to a system degradation. The degradation color may be indicative of the type of event or condition that is associated with the degradation. For example, the degradation color may be associated with a level of alert. For example a degradation color of red may be associated with a higher level of alert than a degradation color of yellow.

Figure 10:
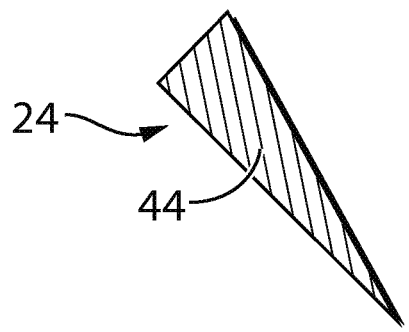
FIG. 10 shows another exemplary configuration of the indicator generated by the system of FIG. 2 and graphically showing the current approach/landing capability of the aircraft of FIG. 1 and the approach/landing intent of the flight crew.

FIG. 10 shows another exemplary configuration of indicator 24 graphically and simultaneously showing the approach/landing capability of aircraft 10 and also the approach/landing intent of the flight crew. In this configuration, only first graphical object 44 is required to graphically indicate that a "steep" approach is intended by the flight crew. First graphical object 44 may be significantly different than those illustrated in previous figures and may be used as a substitute in the event where a steep approach is selected. In this configuration, second graphical object 46 may not be required. The approach/landing capability may be represented by way of showing first graphical object 44 in the "capability available" (e.g., green) color.

Figure 11:
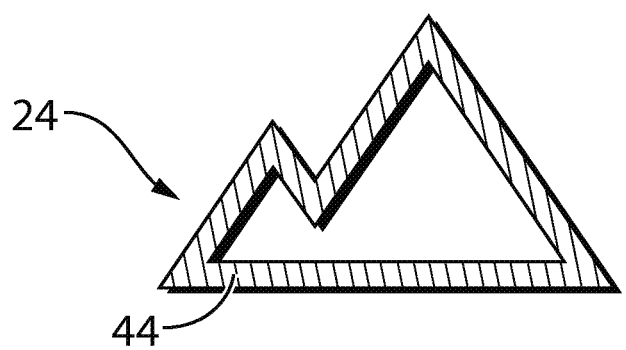
FIG. 11 shows another exemplary configuration of the indicator generated by the system of FIG. 2 and graphically showing the current approach/landing capability of the aircraft of FIG. 1 and the approach/landing intent of the flight crew.

FIG. 11 shows another exemplary configuration of indicator 24 graphically and simultaneously showing the approach/landing capability of aircraft 10 and also the approach/landing intent of the flight crew. In this configuration, only first graphical object 44 is required to graphically indicate that an approach using a synthetic vision system (SVS) is intended by the flight crew. First graphical object 44 may be significantly different than those illustrated in previous figures and may be used as a substitute in the event where the SVS approach type is selected. In this configuration, second graphical object 46 may not be required. The approach/landing capability may be represented by way of showing first graphical object 44 in the "capability available" (e.g., green) color.

Figure 12:
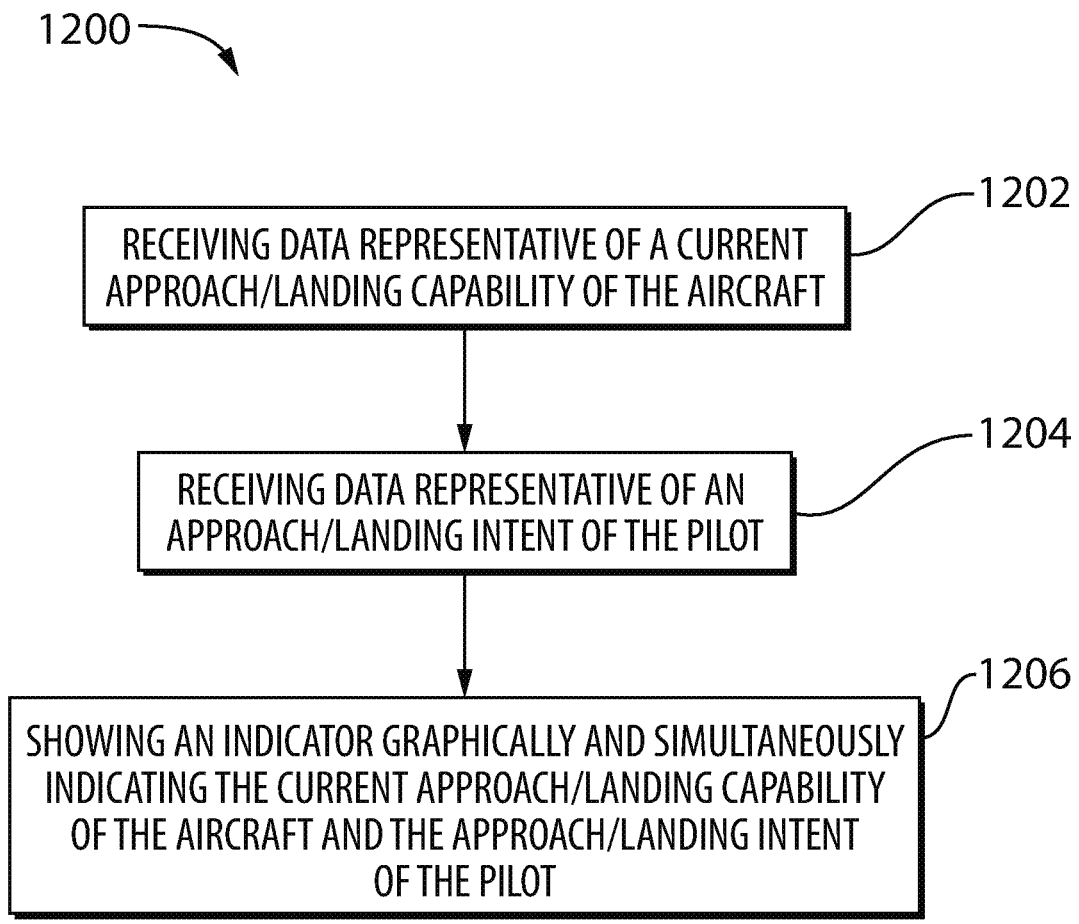
FIG. 12 is a flowchart illustrating an exemplary method for assisting with aircraft landing.

FIG. 12 is a flowchart illustrating an exemplary method 1200 for assisting with aircraft landing. Method 1200 may be executed in entirety or in part using system 26 based on machine-readable instructions 34. Method 1200 or part(s) thereof may be combined with other methods or steps disclosed herein. Method 1200 may comprise: receiving data 38 representative of a current approach/landing capability of aircraft 10 (see block 1202) and data 40 representative of an approach/landing intent of the pilot (see block 1204); and on display device 14 of aircraft 10, showing indicator 24 graphically and simultaneously indicating the current approach/landing capability of aircraft 10 and the approach/landing intent of the pilot (see block 1206). The approach/landing intent of the pilot may be graphically indicated via cooperation between first graphical object 44 of indicator 24 and second graphical object 46 of indicator 24.

In some embodiments, first graphical object 44 and second graphical object 46 may be of different colors. First graphical object 44 may graphically indicate a plurality of potential approach/landing types and a position of second graphical object 46 relative to first graphical object 44 may indicate the approach/landing intent of the pilot from the plurality of potential approach/landing types. In some embodiments, second graphical object 46 may comprise a caret movably positionable relative to first graphical object 44 to indicate the approach/landing intent of the pilot.

In some embodiments, first graphical object 44 may comprise first segment 44A representing an approach phase of operation of aircraft 10 and second segment 44B representing a landing phase of operation of aircraft 10. First segment 44A and second segment 44B of first graphical object 44 may be substantially linear. In some embodiments, first segment 44A and second segment 44B may be non-parallel.

In some embodiments, first graphical object 44 may comprise a first color graphically indicating one or more approach/landing types that are available and a second color graphically indicating one or more approach/landing types that are unavailable.

In some embodiments, indicator 24 may graphically indicate a system degradation affecting the current approach/landing capability. In some embodiments, method 1200 may comprise temporarily causing first graphical object 44 to comprise a third (i.e., degradation) color (e.g., yellow or red) to graphically indicate a system degradation affecting the current approach/landing capability.

Figure 13:
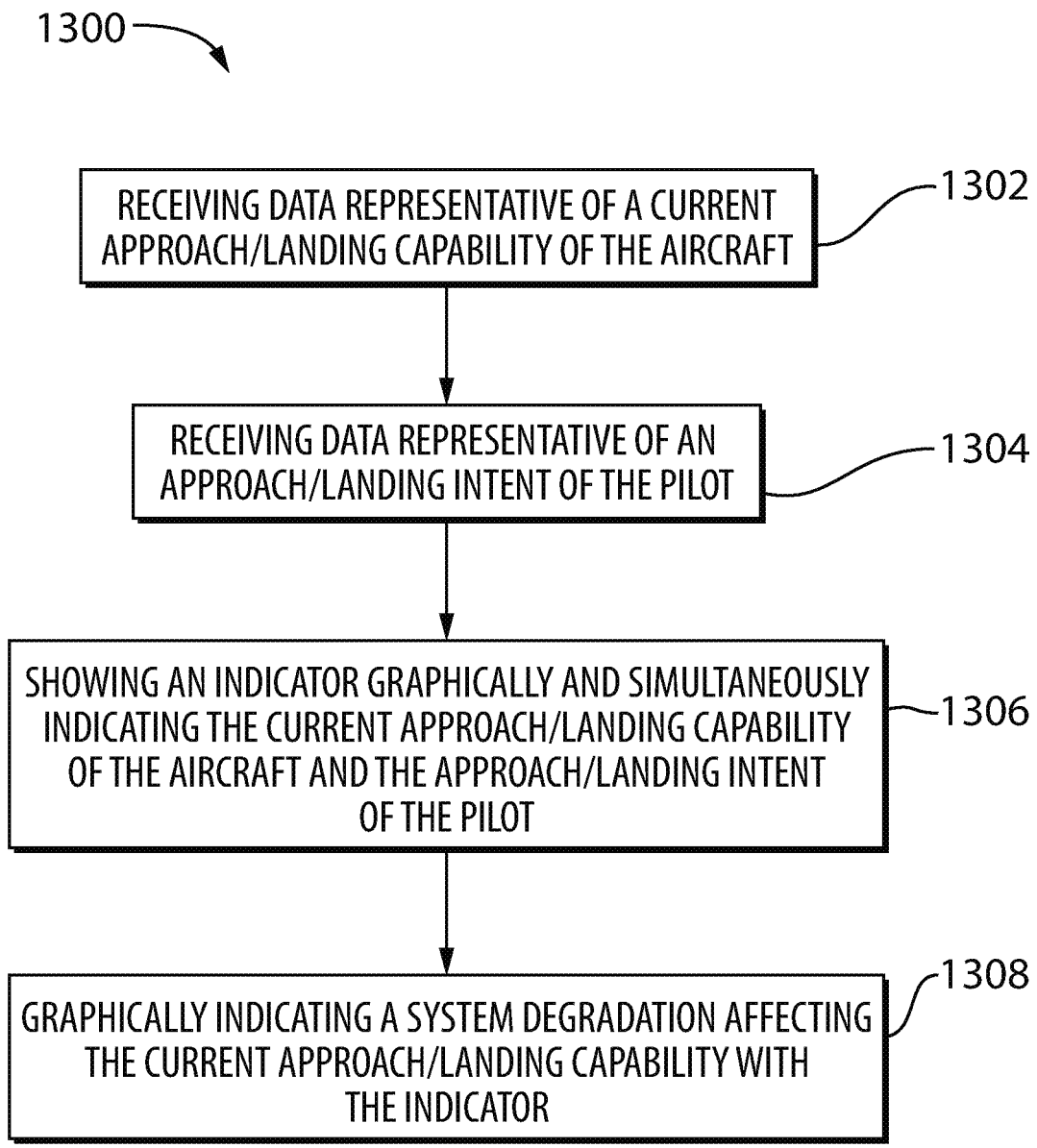
FIG. 13 is a flowchart illustrating another exemplary method for assisting with aircraft landing.

FIG. 13 is a flowchart illustrating another exemplary method 1300 for assisting with aircraft landing. Method 1300 may be executed in entirety or in part using system 26 based on machine-readable instructions 34. Method 1300 or part(s) thereof may be combined with other methods or steps disclosed herein. Method 1300 may comprise: receiving data 38 representative of a current approach/landing capability of aircraft 10 (see block 1302) and data 40 representative of an approach/landing intent of the pilot (see block 1304); on display device 14 of aircraft 10, showing indicator 24 graphically and simultaneously indicating the current approach/landing capability of aircraft 10 and the approach/landing intent of the pilot (see block 1306); and graphically indicating a system degradation affecting the current approach/landing capability with indicator 24 (see block 1308).

In some embodiments, method 1300 may comprise graphically indicating the system degradation by temporarily showing a degradation color on at least part of indicator 24.

In some embodiments, method 1300 may comprise graphically indicating the approach/landing intent of the pilot via cooperation between first graphical object 44 of indicator 24 and second graphical object 46 of indicator 24. First graphical object 44 may comprise a first color graphically indicating one or more approach/landing types that are available and a second color graphically indicating one or more approach/landing types that are unavailable. Method 1300 may comprise causing first graphical object 44 to comprise a third/degradation color to graphically indicate the system degradation.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, while the systems, devices and methods disclosed and shown herein may comprise a specific number of elements/components, the systems, devices and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. The scope of the claims should not be limited by the preferred embodiments set forth in the examples, but should be given the broadest interpretation consistent with the description as a whole.

What is claimed is:

1. A system for assisting a pilot with landing an aircraft, the system comprising:
    a data processor; and
    non-transitory machine-readable memory storing instructions executable by the processor and configured to cause the processor to:
        using data representative of a current approach/landing capability of the aircraft and data representative of an approach/landing intent of the pilot, generate an output for causing a display device of the aircraft to show an indicator graphically and simultaneously indicating the current approach/landing capability of the aircraft and the approach/landing intent of the pilot, the approach/landing intent of the pilot being graphically indicated via cooperation between a first graphical object of the indicator and a second graphical object of the indicator,
    wherein the first graphical object graphically indicates a plurality of potential approach/landing types and a position of the second graphical object relative to the first graphical object indicates the approach/landing intent of the pilot from the plurality of potential approach/landing types.

2. The system as defined in claim 1, wherein the first graphical object and the second graphical object are of different colors.

3. The system as defined in claim 1, wherein the second graphical object comprises a caret movably positionable relative to the first graphical object to indicate the approach/landing intent of the pilot.

4. The system as defined in claim 1, wherein the first graphical object comprises a first segment representing an approach phase of operation of the aircraft and a second segment representing a landing phase of operation of the aircraft.

5. The system as defined in claim 4, wherein the first and second segments of the first graphical object are substantially linear.

6. The system as defined in claim 5, wherein the first segment and the second segment are non-parallel.

7. The system as defined in claim 1, wherein the first graphical object comprises a first color graphically indicating one or more approach/landing types that are available and a second color graphically indicating one or more approach/landing types that are unavailable.

8. The system as defined in claim 7, wherein the first graphical object comprises a third color graphically indicating a system degradation affecting the current approach/landing capability.

9. The system as defined in claim 1, wherein the indicator graphically indicates a system degradation affecting the current approach/landing capability.

10. The system as defined in claim 9, wherein the output of the processor is configured to cause a temporary showing of a degradation color on at least part of the first graphical object to graphically indicate the system degradation.

11. An aircraft comprising a system for assisting a pilot with landing an aircraft, the system comprising: a data processor; and non-transitory machine-readable memory storing instructions executable by the processor and configured to cause the processor to: using data representative of a current approach/landing capability of the aircraft and data representative of an approach/landing intent of the pilot, generate an output for causing a display device of the aircraft to show an indicator graphically and simultaneously indicating the current approach/landing capability of the aircraft and the approach/landing intent of the pilot, the approach/landing intent of the pilot being graphically indicated via cooperation between a first graphical object of the indicator and a second graphical object of the indicator, wherein the first graphical object graphically indicates a plurality of potential approach/landing types and a position of the second graphical object relative to the first graphical object indicates the approach/landing intent of the pilot from the plurality of potential approach/landing types.

12. A display device for assisting a pilot with landing an aircraft, the display device comprising:
- a display area; and
- an indicator shown in the display area, the indicator graphically and simultaneously illustrating a current approach/landing capability of the aircraft and an approach/landing intent of the pilot, the approach/landing intent of the pilot being graphically indicated via cooperation between a first graphical object of the indicator and a second graphical object of the indicator, wherein the first graphical object graphically indicates a plurality of potential approach/landing types and a position of the second graphical object relative to the first graphical object indicates the approach/landing intent of the pilot from the plurality of potential approach/landing types.

13. The display device as defined in claim 12, wherein the first graphical object and the second graphical object are of different colors.

14. The display device as defined in claim 12, wherein the second graphical object comprises a caret movably positionable relative to the first graphical object to indicate the approach/landing intent of the pilot.

15. The display device as defined in claim 12, wherein the first graphical object comprises a first segment representing an approach phase of operation of the aircraft and a second segment representing a landing phase of operation of the aircraft.

16. The display device as defined in claim 15, wherein the first and second segments of the first graphical object are substantially linear.

17. The display device as defined in claim 16, wherein the first segment and the second segment are non-parallel.

18. The display device as defined in claim 12, wherein the first graphical object comprises a first color graphically indicating one or more approach/landing types that are available and comprises a second color graphically indicating one or more approach/landing types that are unavailable.

19. The display device as defined in claim 18, wherein the first graphical object comprises a third color graphically indicating a system degradation affecting the current approach/landing capability.

20. The display device as defined in claim 12, wherein the indicator graphically indicates a system degradation affecting the current approach/landing capability.

21. The display device as defined in claim 20, wherein the system degradation is graphically indicated by a temporary showing of a degradation color on at least part of the first graphical object.

22. The display device as defined in claim 12, wherein the display device is a primary flight display of the aircraft.

23. An aircraft comprising a display device for assisting a pilot with landing an aircraft, the display device comprising: a display area; and an indicator shown in the display area, the indicator graphically and simultaneously illustrating a current approach/landing capability of the aircraft and an approach/landing intent of the pilot, the approach/landing intent of the pilot being graphically indicated via cooperation between a first graphical object of the indicator and a second graphical object of the indicator, wherein the first graphical object graphically indicates a plurality of potential approach/landing types and a position of the second graphical object relative to the first graphical object indicates the approach/landing intent of the pilot from the plurality of potential approach/landing types.

24. A method for assisting a pilot with landing an aircraft, the method comprising:
- receiving data representative of a current approach/landing capability of the aircraft and data representative of an approach/landing intent of the pilot; and
- on a display device of the aircraft, showing an indicator graphically and simultaneously indicating the current approach/landing capability of the aircraft and the approach/landing intent of the pilot, the approach/landing intent of the pilot being graphically indicated via cooperation between a first graphical object of the indicator and a second graphical object of the indicator,
- wherein the first graphical object graphically indicates a plurality of potential approach/landing types and a position of the second graphical object relative to the first graphical object indicates the approach/landing intent of the pilot from the plurality of potential approach/landing types.

25. The method as defined in claim 24, wherein the first graphical object and the second graphical object are of different colors.

26. The method as defined in claim 24, wherein the second graphical object comprises a caret movably positionable relative to the first graphical object to indicate the approach/landing intent of the pilot.

27. The method as defined in claim 24, wherein the first graphical object comprises a first segment representing an approach phase of operation of the aircraft and a second segment representing a landing phase of operation of the aircraft.

28. The method as defined in claim 27, wherein the first and second segments of the first graphical object are substantially linear.

29. The method as defined in claim 28, wherein the first segment and the second segment are non-parallel.

30. The method as defined in claim 24, wherein the first graphical object comprises a first color graphically indicating one or more approach/landing types that are available and a second color graphically indicating one or more approach/landing types that are unavailable.

31. The method as defined in claim 30, comprising temporarily causing the first graphical object to comprise a third color to graphically indicate a system degradation affecting the current approach/landing capability.

32. The method as defined in claim 24, wherein the indicator graphically indicates a system degradation affecting the current approach/landing capability.

33. The method as defined in claim 32, comprising temporarily showing a degradation color on at least part of the first graphical object to graphically indicate the system degradation.

* * * * *